(12) United States Patent
Li

(10) Patent No.: US 9,894,720 B1
(45) Date of Patent: Feb. 13, 2018

(54) LINEAR CONSTANT CURRENT LED DRIVER CIRCUIT IN ACTIVE VALLEY-FILL CIRCUIT MODE

(71) Applicant: NANJING VIC-POWER Co., Ltd., NanJing (CN)

(72) Inventor: Zongbing Li, NanJing (CN)

(73) Assignee: NANJING VIC-POWER CO., LTD., Nanjing (CN)

( * ) Notice: Subject to any disclaimer, the term of this patent is extended or adjusted under 35 U.S.C. 154(b) by 0 days.

(21) Appl. No.: 15/654,208

(22) Filed: Jul. 19, 2017

(30) Foreign Application Priority Data

Apr. 28, 2017 (CN) .......................... 2017 1 0291361

(51) Int. Cl.
*H05B 33/00* (2006.01)
*H05B 33/08* (2006.01)

(52) U.S. Cl.
CPC ..... *H05B 33/0812* (2013.01); *H05B 33/0842* (2013.01)

(58) Field of Classification Search
CPC ............ H05B 33/0815; H05B 33/0827; H05B 33/089; H05B 33/0845; H05B 33/0851; H05B 33/0803; H05B 33/083; H05B 33/0887; H05B 33/0866; H05B 33/0818; H05B 37/02; H05B 37/0227; H05B 37/0272; H05B 33/08
See application file for complete search history.

(56) References Cited

U.S. PATENT DOCUMENTS 9,674,918 B2 * 6/2017 Seki .................. H05B 33/0827
9,706,615 B2 * 7/2017 Seki .................. H05B 33/0815
9,763,295 B2 * 9/2017 Kato ................. H05B 33/0815
9,814,115 B2 * 11/2017 Kido ................... H05B 33/089

FOREIGN PATENT DOCUMENTS

| CN | 104883798 | 9/2015 |
| CN | 105392261 | 3/2016 |
| CN | 106413192 | 2/2017 |

\* cited by examiner

*Primary Examiner* — Monica C King
(74) *Attorney, Agent, or Firm* — Rankin, Hill & Clark LLP

(57) ABSTRACT

The present invention discloses a linear constant current LED driver circuit in active valley-fill circuit mode comprising a rectifier bridge, a capacitor C1, a diode D1, a diode D2, a diode D3, a diode D4, a LED string and a constant current module. The constant current module comprises a N-mosfet N1, a first operational amplifier, a N-mosfet N2 and a second operational amplifier. During a frequency circle, the LED string can be discharged by firstly charging the capacitor C1 for energy saving through the LED string in constant current and then by the energy stored in the capacitor C1 in constant current, which further ensures that the efficiency of the whole linear constant current driver circuit is improved and the current passing through the LED string has a smaller frequency ripple with a large difference between the DC input voltage and the voltage at two ends of the LED string.

3 Claims, 5 Drawing Sheets

LINEAR CONSTANT CURRENT LED DRIVER CIRCUIT IN ACTIVE VALLEY-FILL CIRCUIT MODE

TECHNICAL FIELD

The present invention relates to a LED driver circuit, in particular, to a linear constant current LED driver circuit in active valley-fill circuit mode.

BACKGROUND

Since its advantages of simple scheme, low cost, being without high frequency transformer and EMC, LED linear constant current driver circuit is widely used.

The currently used LED linear constant current driver circuit is shown in FIG. 1, wherein the input DC source is connected to the input end of a rectifier bridge 101 and the positive output end of the rectifier bridge 101 is connected to the input end of a LED string 102, the negative output end of the rectifier bridge 101 is connected to the ground. A constant current module 103 is constituted by an amplifier 104 and a N-mosfet 105. The output end of the LED string 102 is connected with the drain of the N-mosfet 105, the gate of the N-mosfet 105 is connected with the output end of the operational amplifier 104 and the source of the N-mosfet 105 is connected with one end of the current sampling resistor 106 and the negative input end of the operational amplifier 104 respectively, another end of the current sampling resistor 106 being connected with ground and the positive input end of the operational amplifier 104 being connected with the reference voltage Vref. FIG. 2 is a simplified timing view of the circuit.

Assuming that the rectified voltage is Vin and the voltage at two sides of the LED string 102 is Vled, when Vin is higher than Vled, there is current passing through the LED string 102 and into the constant current module 103 and forming a voltage signal on the current sampling resistor 106; the operational amplifier 104 inputting signal to control the gate of the N-mosfet 105 by comparing signals at positive and negative input end allows the voltage between the source and drain of the N-mosfet 105 to be dynamically adjusted and the voltage signal at the source of the N-mosfet 105 to be equal to the reference voltage Vref, thus achieving the purpose of the current passing through the LED string 102 constantly.

As such, assuming that the resistance of the current sampling resistor is Rcs and the voltage of the N-mosfet 105 is Vds, $V_{ds}=V_{in}-V_{led}$ and the power consumption of the N-mosfet 105 is $$P = V_{ds}^* \frac{V_{ref}}{R_{cs}} = (V_{in} - V_{led}) * \frac{V_{ref}}{R_{cs}};$$

assuming that $V_{ds}=V_{led}$, i.e. The voltage difference between the input voltage Vin and the voltage at two ends of the LED string 102 is $$\frac{1}{2} * V_{in},$$

the efficiency of entire driver circuit is 50%. It is shown that the larger the voltage difference between the input voltage Vin and the voltage at two ends of the LED string 102, the larger the power consumption of the N-mosfet 105, and thus the lower the efficiency of entire driver circuit.

If the number of LED lamp in the LED string 102 is increased, the voltage difference between the input voltage Vin and the voltage at two ends of the LED string 102 will decreased, however, increasing the number of LED lamp in the LED string 102 will cause the increasing cost, therefore it is a good method for improving efficiency.

Thus, the problem in prior art is that how to improve the efficient of the whole linear constant current LED driver circuit upon the larger voltage difference between the input voltage Vin and the voltage at two ends of the LED string 102.

SUMMARY

Purpose of Invention: The purpose of the present invention is to provide a linear constant current LED driver circuit in active valley-fill circuit mode improving the efficiency of the whole linear constant current LED driver circuit without a need to decrease the voltage difference between the input voltage Vin and the voltage at two ends of the LED string 102. Technical Scheme: The linear constant current LED driver circuit in active valley-fill circuit mode of the present invention comprises a LED string, wherein the DC voltage is input into the input end of the LED string and the output end of the LED string is connected with the anode of the diode D1 and the drain of the N-mosfet N1 respectively, the cathode of the diode D1 being connected with the anode of the diode D2 and one end of the capacitor C1 respectively, the cathode of the diode D2 being connected with the input end of the LED string; the gate of the N-mosfet N1 is connected with the output end of the first operational amplifier O1 and the source of the N-mosfet N1 is connected with the negative input end of the first operational amplifier O1 and one end of the resistor R1 respectively; another end of the capacitor C1 is connected with the anode of the diode D3 and the cathode of the diode D4 respectively and the cathode of the diode D3 is connected with the drain of the N-mosfet N2, the gate of the N-mosfet N2 being connected with the output end of the second operational amplifier O2 and the source of the N-mosfet N2 is connected with the negative input end of the second operational amplifier O2 and one end of the resistor R1 respectively, both of another end of the resistor R1 and the anode of the diode D4 being connected with ground; the first operational amplifier O1, through comparing the voltage at positive input end with that at negative input end thereof, inputs a voltage signal to control the voltage at the gate of the N-mosfet N1 for dynamically adjusting the voltage between the drain and source of the N-mosfet N1; the second operational amplifier O2, through comparing the voltage at positive input end with that at negative input end thereof, inputs a voltage signal to control the voltage at the gate of the N-mosfet N2 for dynamically adjusting the voltage between the drain and source of the N-mosfet N2; furthermore, the voltage at the positive input end of the second operational amplifier O2 is higher than that of the first operational amplifier O1.

Further, a rectifier bridge is also included, and the rectifier bridge is used to rectify an AC voltage into a DC voltage for then powering the LED string.

Further, the LED string includes a plurality of serial light-emitting diodes.

Beneficial Effects: The present invention discloses a linear constant current LED driver circuit in active valley-fill circuit mode; during a frequency circle, the LED string can be discharged by firstly charging the capacitor C1 for energy storage through the LED string in constant current and then by the energy stored in the capacitor C1 in constant current, which further ensures that the efficient of the whole linear constant current driver circuit is improved and the current passing through the LED string has a smaller ripple in the case of a large difference between the DC input voltage and the voltage at two ends of the LED string.

DETAILED DESCRIPTION

The technical scheme of the invention will be further described in detail in combination with drawings and the specific embodiments.

Figure 1:
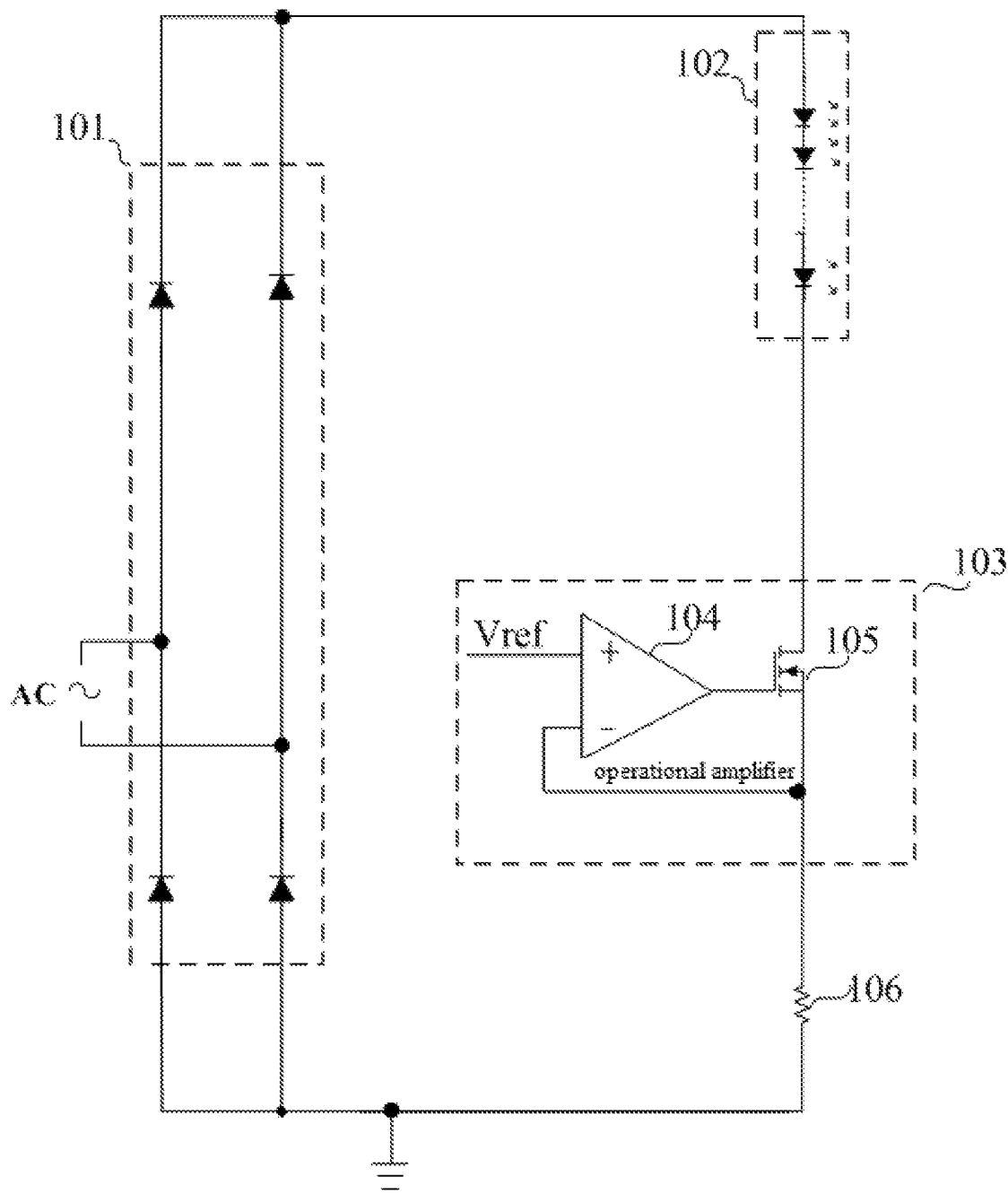
FIG. 1 is a linear constant current LED driver circuit of the prior art.
Figure 2:
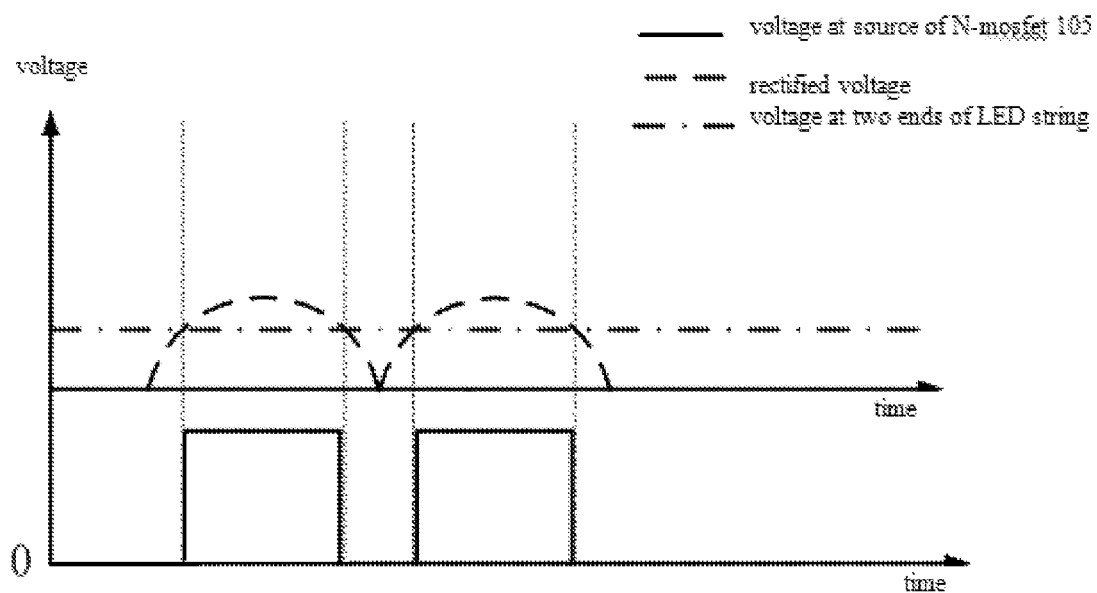
FIG. 2 is a simplified timing view of the circuit in FIG. 1.
Figure 3:
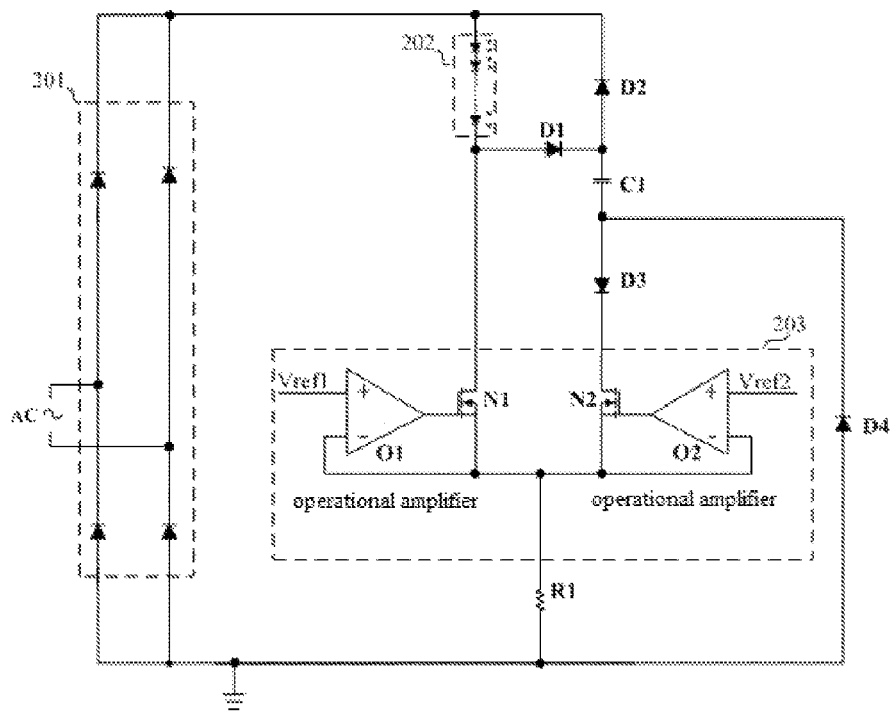
FIG. 3 is a linear constant current LED driver circuit in specific embodiments of the present invention.

The present specific embodiment discloses a linear constant current LED driver circuit in active valley-fill circuit mode, as shown in FIG. 3, comprising a rectifier bridge 201, a LED string 202 and a constant current module 203, the LED string including a plurality of serial light-emitting diodes, the constant current module 203 including a N-mosfet N1, a first operational amplifier O1, a N-mosfet N2 and a second operational amplifier O2. The AC input end of the rectifier bridge 201 is connected with a AC power supply and the positive terminal of the DC output end is connected with the input end of the LED string 202; the output end of the LED string 202 is connected with the anode of the diode D1 and the drain of the N-mosfet N1 respectively, the cathode of the diode D1 being connected with the anode of the diode D2 and one end of the capacitor C1 respectively, the cathode of the diode D2 being connected with the input end of the LED string 202; the gate of the N-mosfet N1 is connected with the output end of the first operational amplifier O1 and the source of the N-mosfet N1 is connected with the negative input end of the first operational amplifier O1 and one end of the resistor R1 respectively; another end of the capacitor C1 is connected with the anode of the diode D3 and the cathode of the diode D4 respectively and the cathode of the diode D3 is connected with the drain of the N-mosfet N2; the gate of the N-mosfet N2 is connected with the output end of the second operational amplifier O2 and the source of the N-mosfet N2 is connected with the negative input end of the second operational amplifier O2 and one end of the resistor R1 respectively, and both another end of the resistor R1 and the anode of the diode D4 are connected with ground. The positive input end of the first operational amplifier O1 is input with a first reference voltage Vref1, while the positive input end of the second operational amplifier O2 with a second operational amplifier Vref2, wherein Vref2>Vref1.

Figure 4:
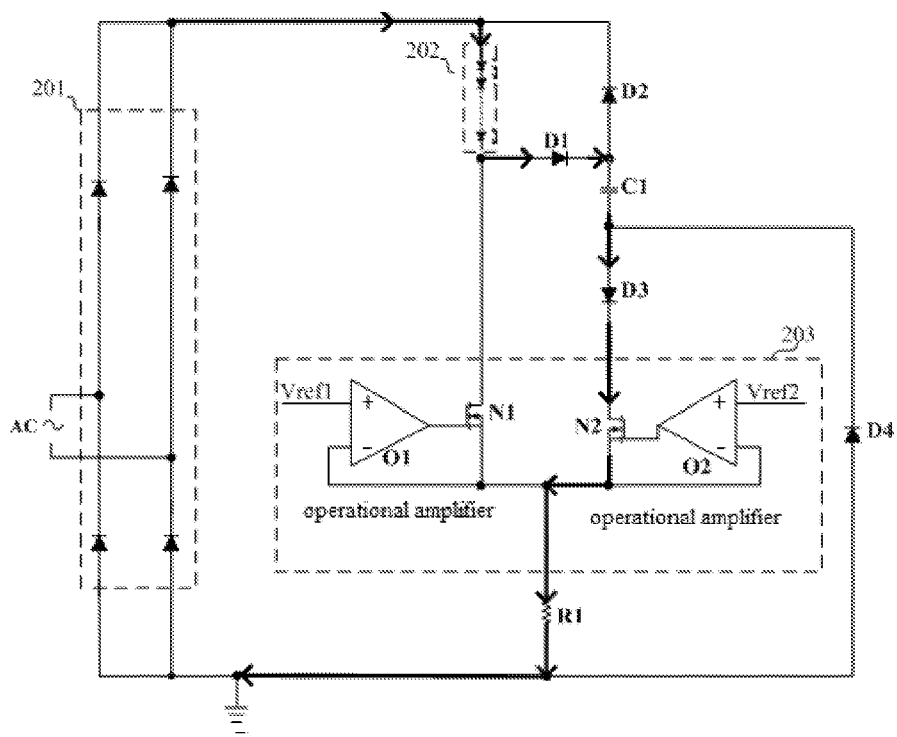
FIG. 4 is a current routine when the circuit of FIG. 3 is operating at stage one.
Figure 5:
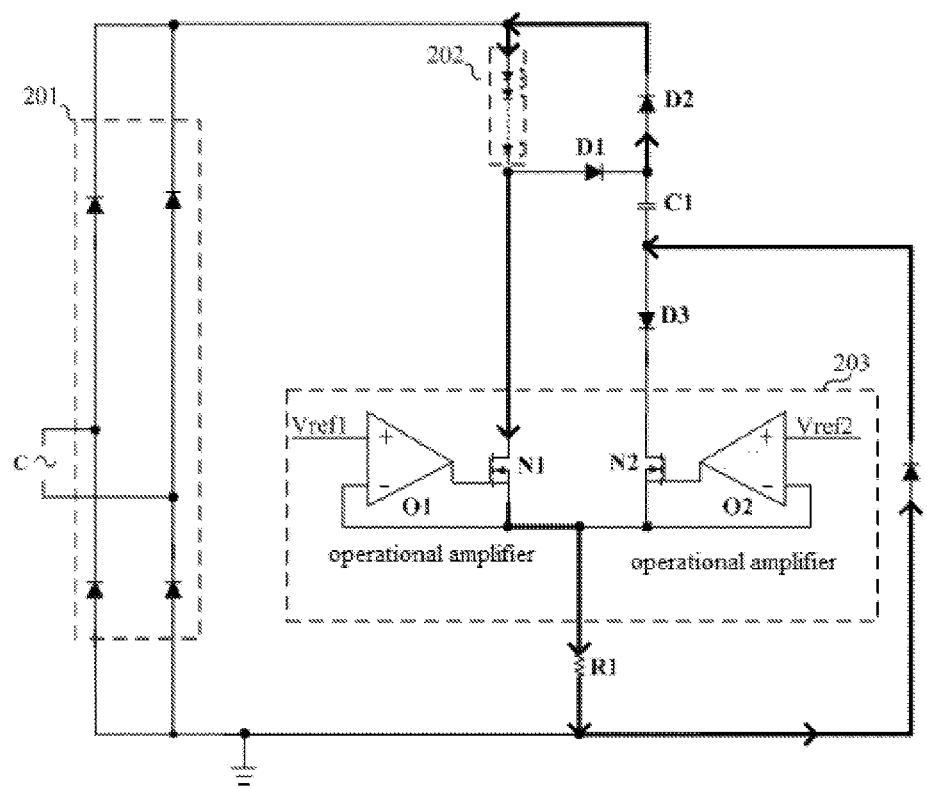
FIG. 5 is a current routine when the circuit of FIG. 3 is operating at stage two.

When the linear constant current LED driver circuit is operating in Stage one, as shown in FIG. 4, the current passes through the LED string 202 into the capacitor C1 and through the diode D3 into the drain of the N-mosfet N2 after passing out of the capacitor C1, and then passing through the sampling resistor R1 to the ground after passing out of the source of the N-mosfet N2 while forming a voltage signal Vcs2 at one end of the sampling resistor R1. The second operational amplifier O2, through comparing the voltage at positive input end with that at negative input end thereof, outputs a voltage signal to control the voltage at the gate of the N-mosfet N2, thereby Vcs2=Vref2 for achieving a constant current. Since Vref2>Vref1, the voltage at negative input end of the first operational amplifier O1 is higher than the voltage at positive input end, the output signal being low-leveled and the N-mosfet N1 being in the cut-off state with no current passing through. At Stage one, the current passes through the LED string for one aspect and the capacitor is charged for energy saving for another aspect, wherein Vin=Vled+Vbulk, Vbulk being the voltage of the capacitor C1 and Vled being the voltage at two ends of the LED string 202. As there is less energy consumption on the N-mosfet N2, the efficiency of the linear constant current driver circuit is close to 100%. When the linear constant current LED driver circuit is operating in Stage two, as shown in FIG. 5, energy stored in the capacitor C1 started to release a current, which passes into the drain of the N-MOSfet N1 from the capacitor C1 through the diode D2 and through the LED string 202, and then passing through the sampling resistor R1 to the ground after passing out of the source of the N-mosfet N1 while forming a voltage signal Vcs1 at one end of the sampling resistor R1. The current flows from one end of the sampling resistor R1, through the diode D4 and back to another end of the capacitor C1. The first operational amplifier O1, through comparing the voltage at positive input end with that at negative input end thereof, outputs a voltage signal to control the voltage at the gate of the N-mosfet N1, thereby Vcs1=Vref1 for achieving a constant current. Due to reverse blocking of the diode D3, there is no current flowing through the N-mosfet N2 reversely. At Stage two, if the drain-source voltage of the N-mosfet N1 is Vds1, Vbulk=Vled+Vds1. If Vbulk=2*Vled, Vin=3*Vled and Vds i=Vled. Thus, the power consumption of N-mosfet N1 is equal to the power of the LED string 202 in Stage two, that is to say, the effectiveness of the linear constant current driver circuit is 50%.

Therefore, although the voltage difference between the DC voltage Vin output from the rectifier bridge 201 and the voltage Vled at two ends of the LED string 202 is $$\frac{2}{3} * V_{in},$$

the effectiveness of the linear constant current driver circuit is larger than 50%. Compared with the prior art, it can be shown that the present embodiments can improve the efficiency of the circuit without decreasing the voltage difference between the DC voltage Vin and the voltage Vled at two ends of the LED string 202.

Figure 6:
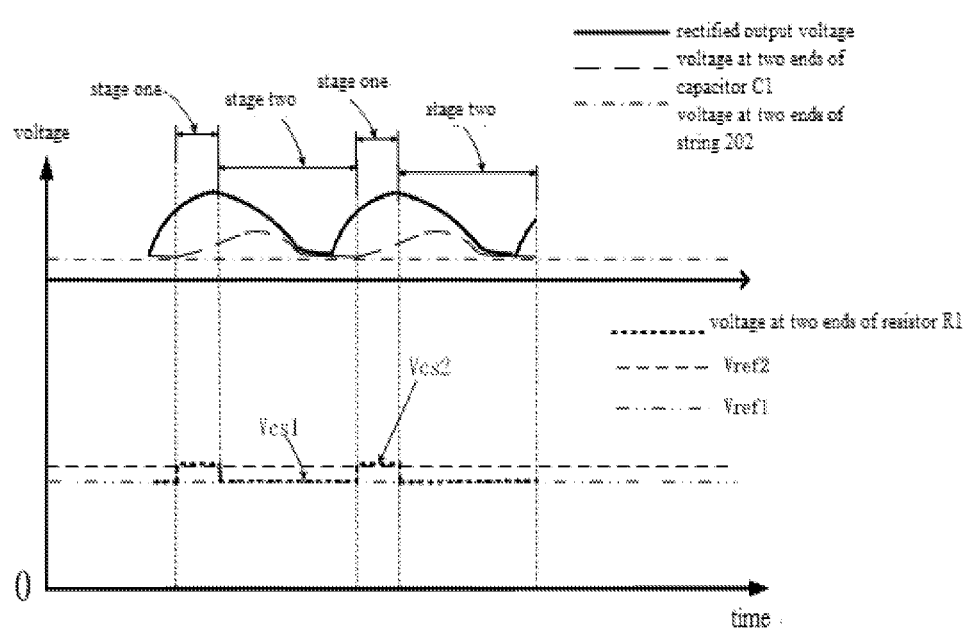
FIG. 6 is a simplified timing view of the circuit in FIG. 3.

As shown in FIG. 6, there is current passing through the LED string 202 throughout the frequency cycle, so the present embodiments have a smaller ripple compared with the prior art.

The invention claimed is:
1. A linear constant current LED driver circuit comprising a LED string, characterized in that DC voltage is input into the input end of the LED string and the output end of the LED string is connected with the anode of a diode D1 and the drain of an N-mosfet N1 respectively, the cathode of the diode D1 being connected with the anode of a diode D2 and one end of a capacitor C1 respectively, the cathode of the diode D2 being connected with the input end of the LED string; the gate of the N-mosfet N1 is connected with the output end of a first operational amplifier O1 and the source of the N-mosfet N1 is connected with the negative input end of the first operational amplifier O1 and one end of a resistor R1 respectively; another end of the capacitor C1 is connected with the anode of a diode D3 and the cathode of a diode D4 respectively and the cathode of the diode D3 is connected with the drain of an N-mosfet N2, the gate of the N-mosfet N2 being connected with the output end of a second operational amplifier O2 and the source of the N-mosfet N2 being connected with the negative input end of the second operational amplifier O2 and one end of the resistor R1 respectively, both of another end of the resistor R1 and the anode of the diode D4 being connected with ground; the first operational amplifier O1, through comparing the voltage at positive input end with that at negative input end thereof, outputs a voltage signal to control the voltage at the gate of the N-mosfet N1 for dynamically adjusting the voltage between the drain and source of the N-mosfet N1; the second operational amplifier O2, through comparing the voltage at positive input end with that at negative input end thereof, outputs a voltage signal to control the voltage at the gate of the N-mosfet N2 for dynamically adjusting the voltage between the drain and source of the N-mosfet N2; furthermore, the voltage at the negative input end of the second operational amplifier O2 is higher than that of the first operational amplifier O1.

2. The linear constant current LED driver circuit according to claim 1, further comprising a rectifier bridge used to rectify an AC voltage into a DC voltage for then powering the LED string.

3. The linear constant current LED driver circuit according to claim 1, wherein the LED string includes a plurality of serial light-emitting diodes.

* * * * *